Figure 1:
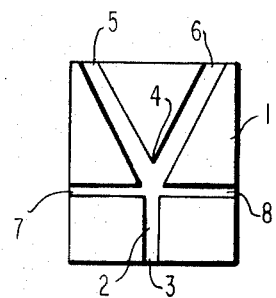

United States Patent [19]
Schützenauer

[11] 3,724,481
[45] Apr. 3, 1973

[54] CONTROL INSTALLATION FOR BALANCING FUEL LEVELS IN MOTOR VEHICLE FUEL TANKS

[75] Inventor: Hans-Dieter Schützenauer, Schorndorf, Germany

[73] Assignee: Daimler-Benz Aktiengesellschaft, Stuttgart Untertuerkheim, Germany

[22] Filed: Apr. 6, 1971

[21] Appl. No.: 131,706

[30] Foreign Application Priority Data

Apr. 7, 1970    Germany...................P 20 16 464.1

[52] U.S. Cl.............................137/101.25, 137/81.5
[51] Int. Cl...........................F15c 1/08, G05d 11/00
[58] Field of Search............137/81.5, 101.25; 280/5

[56] References Cited

UNITED STATES PATENTS

| | | | |
|---|---|---|---|
| 3,267,949 | 8/1966 | Adams | 137/81.5 |
| 3,331,380 | 7/1967 | Schonfeld et al. | 137/81.5 |
| 3,590,843 | 7/1961 | Meyer | 137/81.5 |
| 3,042,060 | 7/1962 | Lindemann | 137/101.25 |
| 3,223,101 | 12/1965 | Bowles | 137/81.5 |
| 3,503,411 | 3/1970 | Bauer et al. | 137/101.25 |
| 3,547,414 | 12/1970 | Nardi | 137/81.5 X |

*Primary Examiner*—William R. Cline
*Attorney*—Craig, Antonelli & Hill

[57] ABSTRACT

A regulating installation for controlling the level of fluid in a plurality of supply tanks for an automotive vehicle. A fluidic control element is arranged in a backflow line for selectively directing the backflow of fuel to the tanks in dependence on the respective levels of fuel existing in the tanks. Control liens leading to the control element from each of the tanks serve for controlling the output of the fluidic control element in response to the particular level of fuel in the tanks. The specific embodiment utilizes a control element constructed with a single inlet communicating with the backflow line and two outlets arranged symmetrically Y-shaped and communicating with respective first and second tanks. Respective first and second control conduits lead from the tanks to a point in the control element downstream of the outlets for controlling the direction of fluid to one or the other of the outlets.

23 Claims, 2 Drawing Figures

PATENTED APR 3 1973  3,724,481

INVENTOR
HANS-DIETER SCHÜTZENAUER

BY Craig, Antonelli, Stewart & Hill

ATTORNEYS

CONTROL INSTALLATION FOR BALANCING FUEL LEVELS IN MOTOR VEHICLE FUEL TANKS

The present invention relates to a control installation for the distribution of a liquid stream adapted to be supplied to tanks or the like.

If a liquid is to be supplied to several tanks or the like, then for the most part a common supply line is provided which includes branch lines to the tanks or containers. If the tanks are connected to different loads or consuming devices or if the distribution is subjected to further influences that may lead to non-uniformities, there arises the problem that a control or regulation must be undertaken, by means of which all tanks are supplied with liquid to a sufficient extent.

The present invention is, therefore, concerned with the task to provide a control installation suitable for solving this problem, which consists of simple structural means and nonetheless assures an operationally reliable functioning. The present invention essentially consists in that a fluidic control element is arranged as distributor means in the supply line whose through-channel is split off Y-shaped and symmetrically, to which control channels are connected immediately upstream of the bifurcation which are connected with the interior of a tank or the like.

The liquid stream which is normally split off approximately symmetrically at the distributor place, produces a vacuum in the control channels whereby a medium is sucked in through these control channels. If the connection of these control channels with the tanks is located below the liquid level, then liquid is sucked in whereas, if the liquid level has dropped below the place of the connection, air or the like is sucked in. The phenomenon is used for the purpose of the control if the sucked-in media have different densities, for example, air and liquid, that the liquid stream flips over to that side at which the density is greatest. An automatically operating regulating mechanism is thus produced by the present invention which offers a maximum measure in operational safety since it operates without movable parts. The quantity of the liquid stream can thereby fluctuate within wide ranges.

In a simple embodiment of the present invention, two mutually oppositely disposed control channels may be provided which are connected with a tank or the like each by way of thin, preferably elastic lines. In order to prevent that the liquid in one tank or the like drops below a minimum, the lines of the control channel may terminate at the height of the minimum permissive level of the tank or the like.

According to a further feature of the present invention, in order to enable also a switching in a maximum position of the liquid level, further control channels may be provided similarly terminating in the through-channel, whose lines terminate at the height of the maximum permissive level in a respective tank or the like.

A particularly advantageous type of construction of the present invention is obtained if the fluidic control element is arranged in the return line to two tanks of a motor vehicle which are each equipped with a supply pump feeding a venting means, to which is connected an injection pump which is connected by way of a pressure regulator with the return line. It is assured with this type of construction of the present invention that, as long as any fuel is still present at all, the fuel is far-reachingly uniformly distributed to the two tanks and therefore can be removed uniformly from both tanks.

Accordingly, it is an object of the present invention to provide a control installation for the distribution of a liquid stream which avoids by simple means the aforementioned shortcomings and drawbacks encountered in the prior art.

A further object of the present invention resides in a regulating installation of the type described above which consists of structurally simple means, yet excels by an extraordinarily reliable operation.

Still another object of the present invention resides in a control system for controlling the distribution of liquid to various tanks which assures a maximum of operational safety and a minimum of maintenance and repair due to the absence of moving parts.

Another object of the present invention resides in a regulating system for regulating the distribution of liquid to tanks or the like, which permits an automatic regulation of the minimum and maximum levels of the liquid in a tank.

Figure 2:
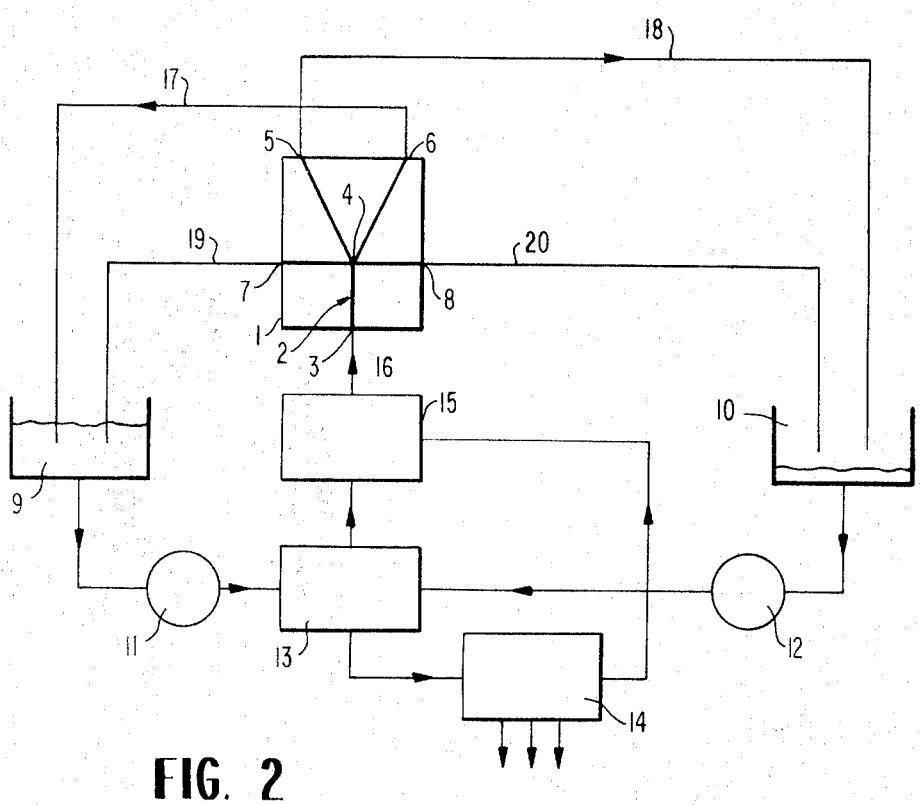

These and further objects, features and advantages of the present invention will become more obvious from the following description when taken in connection with the accompanying drawing which shows, for purposes of illustration only, one embodiment in accordance with the present invention, and wherein:

FIG. 1 is a schematic view of a fluid control element in accordance with the present invention; and FIG. 2 is a schematic control installation according to the present invention for the regulation of the level of two tanks of a motor vehicle.

Referring now to the drawing wherein like reference numerals are used throughout the two views to designate like parts, and more particularly to FIG. 1, the fluid control element 1 illustrated in this figure can be used for producing a regulating mechanism according to the present invention in a feed line leading to the tanks or the like and acts as distributor means. The fluidic element 1 includes a through-channel generally designated by reference numeral 2 with an inlet 3 that terminates downstream of a Y-shaped symmetric bifurcation 4 in two outlets 5 and 6. Two control channels 7 and 8 terminate in the through-channel 2 upstream of the bifurcation 4.

A vacuum is produced in the control channels 7 and 8 by the liquid stream, by means of which a medium is sucked in. The two control channels 7 and 8 are connected with tanks or the like in a manner not illustrated in detail in this figure, such that they draw in liquid or gas, for example, air, depending on the height of the liquid level of a respective tank or the like.

As long as the same medium is sucked in through both control channels 7 and 8, for example, air or liquid, the liquid stream in through-channel 2 is distributed approximately evenly and approximately one-half of the liquid stream is again discharged in each of the outlets 5 and 6. However, if the media sucked into the control channels 7 and 8 have different densities, for example, air and liquid, then the liquid stream in the fluidic element 1 flips over to that side at which the density is largest. Such a control device can be utilized generally for the regulation of liquid levels by means of corresponding fluidic elements 1.

A regulating system is illustrated in FIG. 2, in which a fluidic element is utilized for the regulation of the level of two tanks 9 and 10 of a motor vehicle. The fuel is sucked off from both tanks 9 and 10 by means of supply pumps 11 and 12 and is fed to a venting means 13 of conventional construction, from which the fuel reaches an injection pump 14, also of conventional construction. The fuel, not needed or utilized by the injection pump 14, flows by way of a pressure regulator 15 of conventional construction and by way of a return line 16 back to the tanks 9 and 10. It is to be avoided by the regulating device of the present invention that one of the two tanks 9 and 10 becomes empty during the vehicle operation. In case this occurs, as a result of a non-uniform return due to centrifugal forces, inclined positions of the vehicle, etc., that pump 11 or 12 which sucks in from an empty tank 9 or 10 is destroyed. A constant fuel supply is thereby necessary for the injection pump 14.

The inlet 3 of the fluidic element 1 is connected with the return line 16 whereas the outlets 5 and 6 include their own return lines 17 and 18 which lead to a tank 9 or 10 each. The control channels 7 and 8 are also connected with the tanks by way of thin, preferably elastic lines or hoses 19 and 20. These lines 19 and 20 thereby terminate within the area of the minimum fuel level of a tank 9 and 10.

In the normal case, i.e., when both tanks 9 and 10 are filled or emptied uniformly, the same medium is present in both lines 19 and 20 so that either air or fuel is sucked in by the control channels 7 and 8. In the illustrated case, however, the tank 10 is far-reachingly emptied, i.e., the content thereof has dropped below the minimum fuel level, whereas the tank 9 exhibits a considerably larger filling. Since the line 19 continues to suck in fuel while the line 20 sucks in air, the sucked-in media have different densities. The fuel stream therefore flips over in the fluidic element 1 to the side of the more dense medium, i.e., to the outlet 5 so that the return of the fuel takes place by way of the line 18 exclusively into the tank 10. This takes place for such length of time until the same medium is again sucked in by both lines 19 and 20 which is attained after a level equalization. In that case the returning fuel stream is split up again uniformly in the bifurcation 4. A similar, maximum level control may be achieved by additionally providing two further control channels 7' and 8' (indicated schematically by dash lines in FIG. 2) that terminate in the through-channel 2 opposite one another upstream of the bifurcation 4, which are connected with the tanks at the places of maximum fuel level thereof.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A regulating installation for controlling the level of fluid in two tank means of a motor vehicle comprising: a fluidic control means with a through-channel means having a bifurcation at the downstream end thereof, control channel means connected with said through channel means substantially upstream of the bifurcation, said control channel means being operatively connected with the interior of the respective tank means, return lines leading from opposite sides of the bifurcation at the downstream end of the fluidic control means to the respective tank means, and a backflow line for recirculating a backflow portion of the fluid not utilized by the motor vehicle back to said tank means, said backflow line communicating with the inlet end of said fluidic control means, said control channel means and said fluidic control means being constructed and related to said tank means such that the backflow portion of the fuel is selectively directed to the tank means in dependence on the level of fluid in said respective tank means.

2. An installation according to claim 1, wherein each of said tank means is equipped with a supply pump feeding into a venting means, wherein an injection pump is connected to the venting means, and wherein the injection pump is connected to said backflow line.

3. A regulating installation according to claim 1, characterized in that said bifurcation is substantially Y-shaped and substantially symmetrical.

4. A regulating installation according to claim 3, characterized in that two mutually opposite control channel means are provided which are connected with a respective tank means each by way of relatively thin lines.

5. A regulating installation according to claim 4, characterized in that said lines are elastic lines.

6. A regulating installation according to claim 4, characterized in that the lines of the control channel means terminate at the height of the minimum permissive level of the tank means.

7. A regulating installation according to claim 6, characterized in that further control channel means are provided whose lines terminate at the height of the maximum permissive level of the tank means.

8. A regulating installation according to claim 7, characterized in that said further control channel means terminate mutually opposite one another in said through channel means.

9. A regulating installation according to claim 2, characterized in that the injection pump is connected with the backflow line by way of a pressure regulating means.

10. A regulating installation for controlling the level of fluid in first and second fuel supply tanks of a combustion engine of the type having fuel supplied from both said first and second tanks and having a backflow line means for recirculating a backflow portion of the fuel not utilized by the engine back to said tanks; said installation comprising:
first control line means communicating directly with the interior of said first tank, second control line means communicating directly with the interior of said second tank, fluidic control means arranged with an inlet end thereof in communication with the backflow portion of the fuel in the backflow line means, first return line means leading into said first tank, and second return line means leading into said second tank, said fluidic control means having a first outlet connected to said first return line means and a second outlet connected to said second return line means, said first and second control line means being connected to said fluidic control means downstream of said first and second outlets, said first and second control line means and said fluidic control means being constructed and related to said tank means such that the backflow portion of the fuel is selectively directed to said first and second outlets in dependence on the level of fluid in the respective first and second tank means.

11. An installation according to claim 10, wherein said engine is on an automotive vehicle.

12. An arrangement according to claim 10, wherein each of said first and second control line means include at least one conduit extending downwardly into said respective first and second tanks to predetermined levels, each of said conduits being open to the respective tanks only at the predetermined levels.

13. An installation according to claim 12, wherein said fluidic control means is operative to direct the backflow portion exclusively to the first outlet when the level of fuel in said first tank falls below a predetermined level corresponding to the bottom of the at least one conduit in said first tank.

14. An installation according to claim 12, wherein each of said control line means includes two conduits extending to different predetermined levels in said respective tanks.

15. An arrangement according to claim 10, wherein said first and second control line means terminate mutually opposite one another in the fluidic control means.

16. An arrangement according to claim 10, wherein said first and second control line means are constructed as relatively thin elastic lines.

17. An installation according to claim 10, wherein each of said tanks is equipped with a supply pump feeding into a venting means, wherein an injection pump for injecting fuel to the engine is connected to the venting means, and wherein said backflow line means is connected to the injection pump.

18. A regulating installation according to claim 17, characterized in that the injection pump is connected with the backflow line by way of a pressure regulating means.

19. An installation according to claim 17, wherein said engine is on an automotive vehicle.

20. An arrangement according to claim 19, wherein each of said first and second control line means includes at least one conduit extending downwardly into said respective first and second tanks to predetermined levels, each of said conduits being open to the respective tanks only at the predetermined levels.

21. An installation according to claim 20, wherein said fluidic control means is operative to direct the backflow portion exclusively to the first outlet when the level of fuel in said first tank falls below a predetermined level corresponding to the bottom of the at least one conduit in said first tank.

22. An arrangement according to claim 21, wherein said first and second control line means terminate mutually opposite one another in the fluidic control means.

23. An arrangement according to claim 22, wherein said first and second control line means are constructed as relatively thin elastic lines.

* * * * *